(12) United States Patent
Yang et al.

(10) Patent No.: US 11,877,179 B2
(45) Date of Patent: Jan. 16, 2024

(54) ACTIVE CONGESTION CONTROL FOR POWER SAVING UE IN SIDELINK

(71) Applicant: QUALCOMM Incorporated, San Diego, CA (US)

(72) Inventors: Wei Yang, San Diego, CA (US); Peter Gaal, San Diego, CA (US); Seyedkianoush Hosseini, San Diego, CA (US); Yuchul Kim, San Diego, CA (US); Wanshi Chen, San Diego, CA (US); Juan Montojo, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/150,837

(22) Filed: Jan. 15, 2021

(65) Prior Publication Data

US 2022/0232416 A1  Jul. 21, 2022

(51) Int. Cl.
*H04W 28/02* (2009.01)
*H04W 4/46* (2018.01)
*H04B 17/318* (2015.01)
*H04W 24/10* (2009.01)
*H04W 52/52* (2009.01)
*H04W 72/02* (2009.01)
*H04W 72/0453* (2023.01)

(52) U.S. Cl.
CPC ...... *H04W 28/0289* (2013.01); *H04B 17/318* (2015.01); *H04W 4/46* (2018.02); *H04W 24/10* (2013.01); *H04W 52/52* (2013.01); *H04W 72/02* (2013.01); *H04W 72/0453* (2013.01)

(58) Field of Classification Search
CPC . H04W 28/0289; H04W 24/10; H04W 52/52; H04W 72/02; H04W 72/0453; H04W 24/08; H04W 76/14; H04W 92/18; H04B 17/318; Y02D 30/70
See application file for complete search history.

(56) References Cited

U.S. PATENT DOCUMENTS

2019/0200366 A1* 6/2019 Park ............... H04B 17/318
2020/0187252 A1   6/2020 Lee et al.
(Continued)

FOREIGN PATENT DOCUMENTS

WO   2020067842 A1   4/2020

OTHER PUBLICATIONS

International Search Report and Written Opinion—PCT/US2021/063159—ISA/EPO—dated Apr. 4, 2022.

*Primary Examiner* — Jae Y Lee
*Assistant Examiner* — Aixa A Guadalupe Cruz
(74) *Attorney, Agent, or Firm* — Procopio, Cory, Hargreaves & Savitch LLP

(57) ABSTRACT

To facilitate more efficient sidelink communications, methods, apparatuses, and computer program products are provided. An example method of a user equipment (UE) may include determining a configuration of a set of congestion control measurement resources comprising one or more receiving resources and one or more transmitting resources for transmission of an activity indication signal for sidelink communication. The example method further includes measuring received signal strength indicator (RSSI) on at least one of the one or more receiving resources.

30 Claims, 12 Drawing Sheets

(56) References Cited

U.S. PATENT DOCUMENTS

| | | | | |
|---|---|---|---|---|
| 2021/0022139 A1* | 1/2021 | Shin | .................. | H04W 28/0289 |
| 2021/0337426 A1* | 10/2021 | Lee | ....................... | H04W 40/22 |
| 2021/0400509 A1* | 12/2021 | Lee | ......................... | H04W 4/40 |
| 2022/0132418 A1* | 4/2022 | Hofmann | .......... | H04W 72/1242 |
| 2022/0191733 A1* | 6/2022 | Ali | .......................... | H04W 4/40 |

* cited by examiner

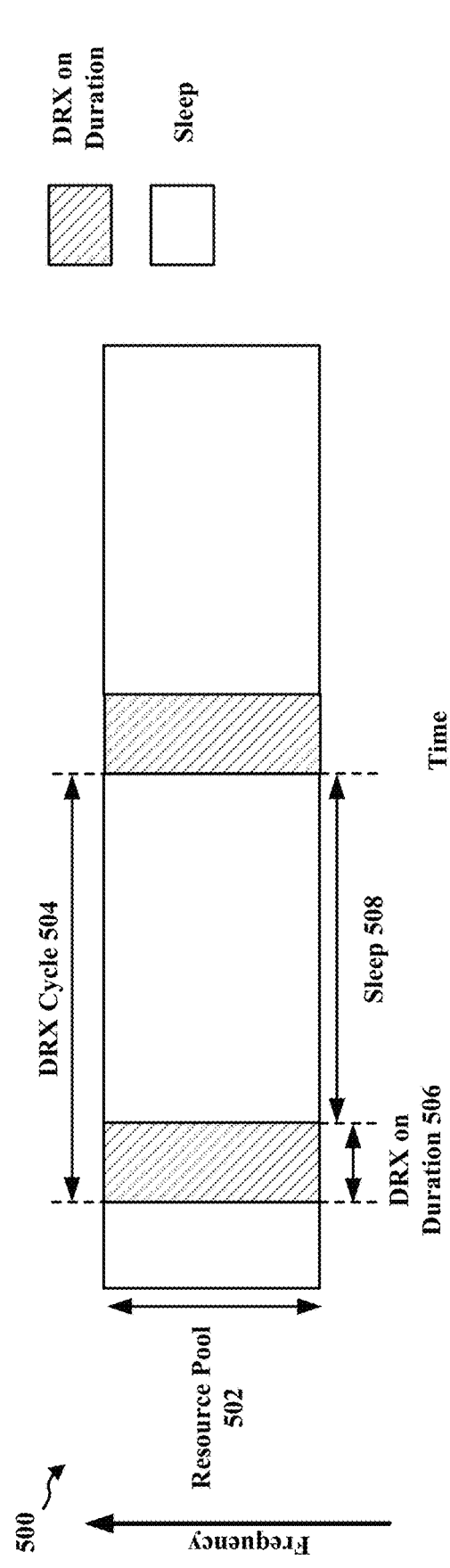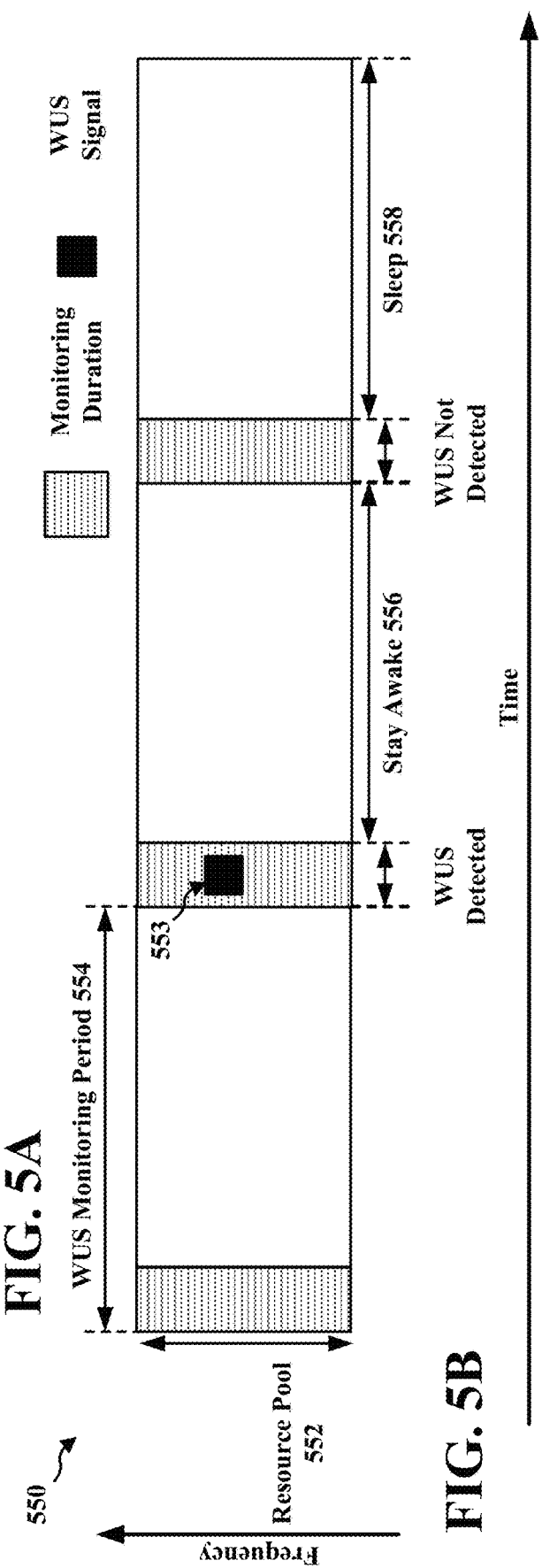
FIG. 5A
FIG. 5B

ACTIVE CONGESTION CONTROL FOR POWER SAVING UE IN SIDELINK

BACKGROUND

Technical Field

The present disclosure relates generally to communication systems, and more particularly, to sidelink communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a user equipment (UE) are provided. The UE may determine a configuration of a set of congestion control measurement resources comprising one or more receiving resources and one or more transmitting resources for transmission of an activity indication signal for sidelink communication. The UE may measure received signal strength indicator (RSSI) on at least one of the one or more receiving resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B illustrate example power saving mechanisms for a UE.

DETAILED DESCRIPTION

Figure 1:
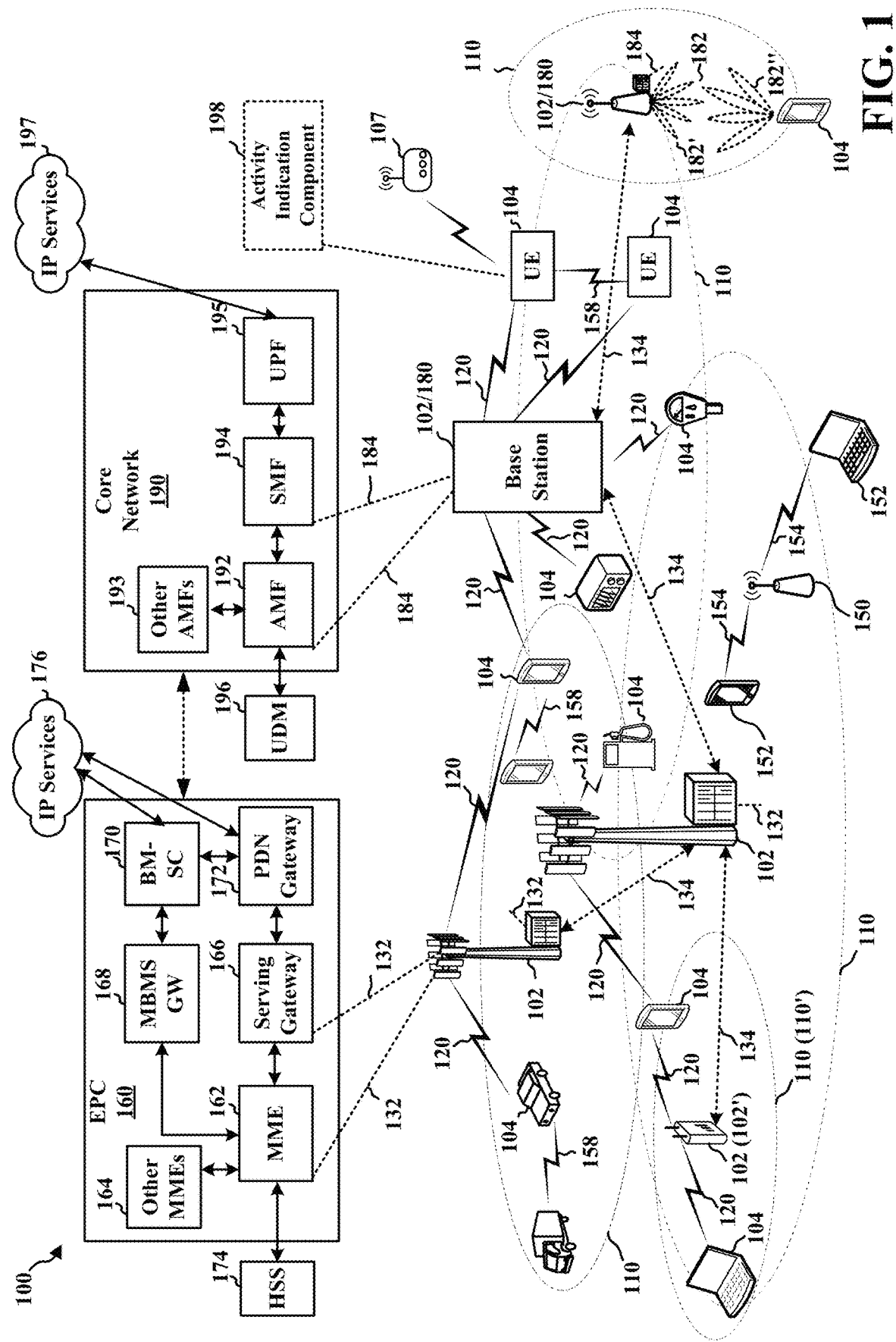
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X or other D2D communication in connection with 5G NR, the concepts described herein may be applicable to other similar areas, such as LTE, LTE-A, CDMA, GSM, and other wireless technologies.

A power-saving UE with power-saving techniques, such as discontinuous reception (DRX), wake-up signal (WUS) indication, bandwidth (BW) adaptation via bandwidth part (BWP) switch or resource pool activation/deactivation, Scell activation/deactivation, or the like, may not be continuously on to compute channel busy ratio (CBR). Aspects that enable UEs to detect activities and measure CBR using a set of congestion control measurement resources are provided herein. For example, a UE 104, Road Side Unit (RSU) 107, or other sidelink devices may include an activity indication component 198 configured to determine a configuration of a set of congestion control measurement resources comprising one or more receiving resources and one or more transmitting resources for transmission of an activity indication signal for sidelink communication. The activity indication component 198 may be further configured to measure RSSI on at least one of the one or more receiving resources.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
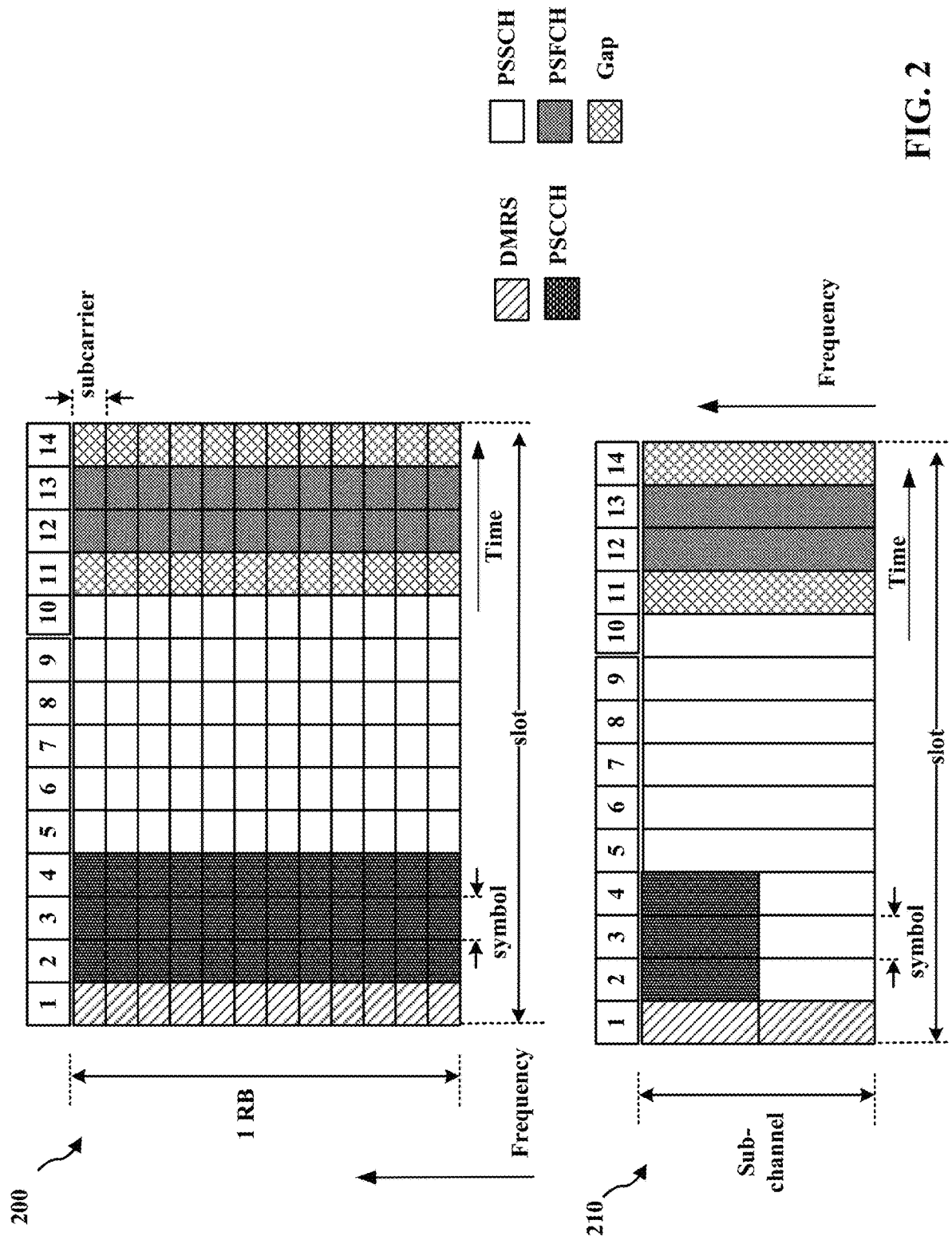
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
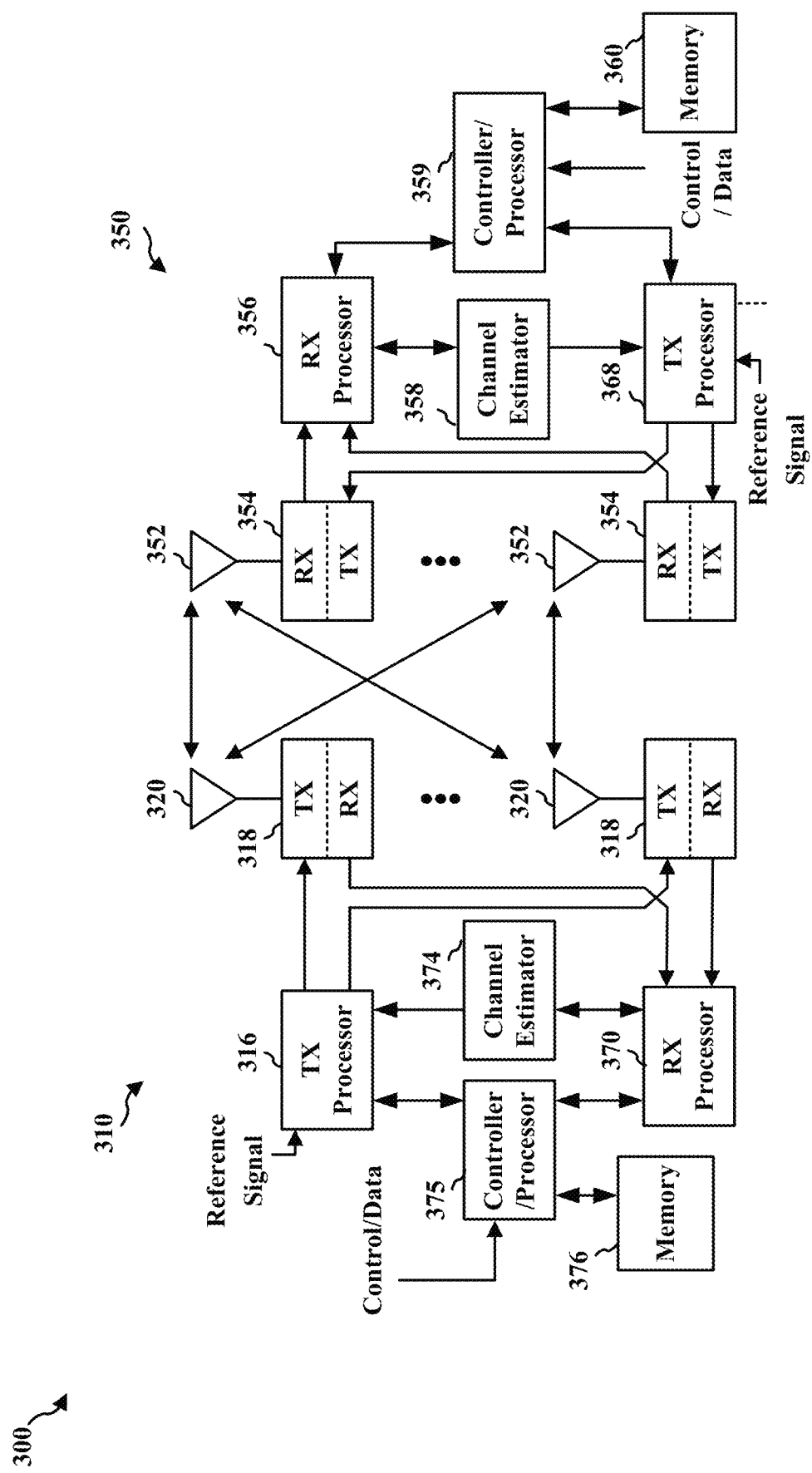
FIG. 3 is a diagram illustrating an example of a base station and user equipment (UE) in an access network.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the activity indication component 198 of FIG. 1.

Some communication may be exchanged directly between wireless devices based on sidelink or a PC5 interface rather than being exchanged between a UE and a base station on an access link or Uu link. One non-limiting example of sidelink communication includes vehicle-to-everything (V2X) communication.

Figure 4:
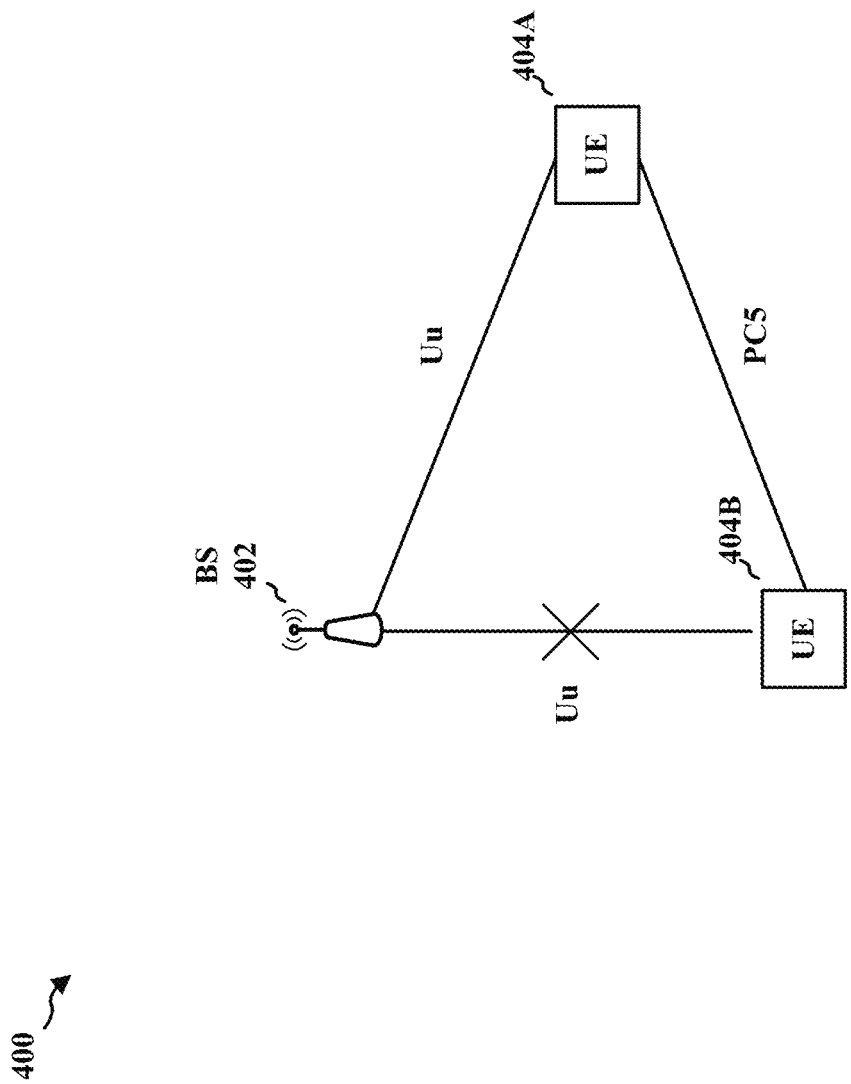
FIG. 4 illustrates an example sidelink communication.

Sidelink communication may include direct wireless communication between a first device (e.g., a first UE or other sidelink device) and a second device (e.g., a second UE or other sidelink device), e.g., without being routed by a base station. A UE may establish a sidelink communication with another with UE with or without receiving a resource allocation for sidelink communication from the base station. For example, as illustrated in example 400 in FIG. 4A, a base station 402 may be in communication with a UE 404A via a Uu link and may be unable to communicate with a UE 404B via Uu link. The UE 404A may be in communication with the UE 404B via a PC5 link to facilitate communications for the UE 404B. The UE 404A and the UE 404B may include the activity indication component 198.

In a first sidelink resource allocation mode (which may be referred to herein as "Mode 1"), centralized resource allocation may be provided by a network entity. For example, a base station 102 or 180 as in FIG. 1, may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmissions. In order to coordinate the selection of sidelink resources by individual UEs, each UE may use a sensing technique to monitor for resource reservations by other sidelink UEs and may select resources for sidelink transmissions from unreserved resources. In order to use the resources for sidelink transmission, the a UE may transmit SCI indicating a reservation of the resources.

To facilitate more efficient sidelink communication, a UE may perform congestion control. As part of the congestion control, the UE may limit one or more transmission parameters in order to reduce the congestion that the UE causes to the communication system. For example, the UE may update (e.g., restrict) one or more of: modulation and coding scheme (MCS) indices and tables, number of sub-channels per transmission, number of retransmissions, transmission power, or the like in order to reduce congestion in the communication system by reducing the CR of the UE. A UE may use CBR as a metric for applying the congestion control procedures by the UE. For example, the UE may estimate or measure the CBR to determine whether the transmission medium is busy. Based on the measured CBR, the UE may limit its own resource utilization, such as by limiting the channel occupancy ratio (CR) to be smaller than a configured threshold when the measured CBR meets a threshold level. To estimate the CBR, the UE may perform RSSI measurements. For example, for PSSCH, the CBR measurement may be based on the fraction of sub-channels for which the UE measures an S-RSSI that exceeds a configured threshold. In some aspects, in order to compute the CBR at slot n, the UE may measure the RSSI for all subchannels between [n−100,n−1], or for the last 100 ms. The CBR indicates how much of the transmission medium is being used by UEs in the communication system. The CR may correspond to an amount of resources used by a particular UE, e.g., the UE measuring the CBR and applying congestion control. The CR may be based on the fraction of sub-channels used for transmission in [n−a, n−1] and granted/reserved in [n, n+b], where a is a positive integer and b is a non-negative integer. For example, a+b+1 may be 1000 and a may be greater than or equal to 500.

The UE may need to be on to measure the RSSI and compute the CBR, which may reduce the battery life of the UE. However, a power-saving UE with power-saving techniques, such as DRX, WUS indication, BW adaptation via BWP switch or resource pool activation/deactivation, Scell activation/deactivation, or the like, may not be continuously on to compute the CBR. Aspects that enable UEs to detect activities and measure CBR using a set of congestion control measurement resources are provided.

FIGS. 5A and 5B illustrate examples 500 and 550 of power-saving mechanisms for a UE. As illustrated in FIG. 5A, for sidelink DRX, within a resource pool 502, the UE may be on (during the DRX duration 506) or asleep (during the sleep 508) within a DRX cycle 504. The sleep and wake cycle, or cycle of DRX ON, DRX OFF durations enable the UE to conserve battery power during periods in which the UE is in a lower power mode (e.g., the sleep mode, DRX OFF duration, etc.). In the low power mode, the UE may skip reception of sidelink communication. As illustrated in FIG. 5B, for a UE with power-saving utilizing WUS, within a resource pool 552, the UE may be in a WUS monitoring period 554. During the monitoring duration of the WUS monitoring period, if the UE detects a WUS 553, the UE may stay awake (e.g., during the stay awake duration 556). If the UE does not detect the WUS 553 during the monitoring duration of the WUS monitoring period, the UE may be asleep (e.g., during the sleep duration 558). Thus, the use of a WUS may enable a DRX UE to more efficiently remain in a low power mode when no transmission may be transmitted to the UE. For a UE that uses these power-saving mechanisms, the UE might not be able to perform CBR measurements when the UE is in the lower power mode, e.g., asleep, during the DRX OFF duration, etc.

Figure 6A:
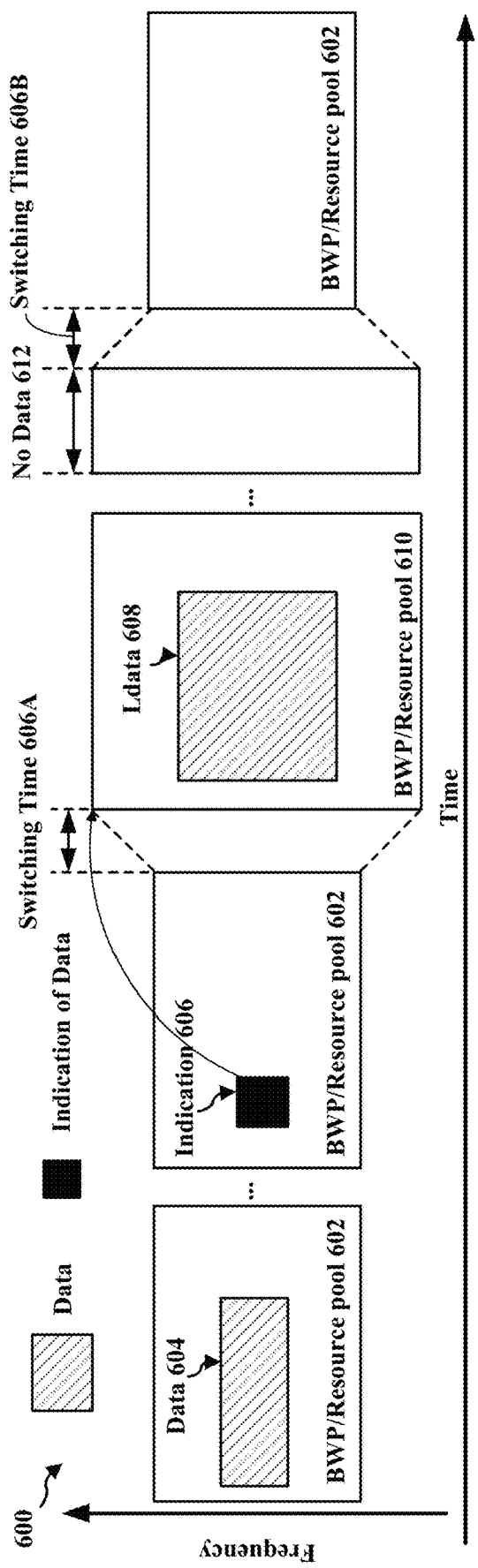
FIGS. 6A and 6B illustrate example bandwidth adaptation mechanisms for a UE.
Figure 6B:
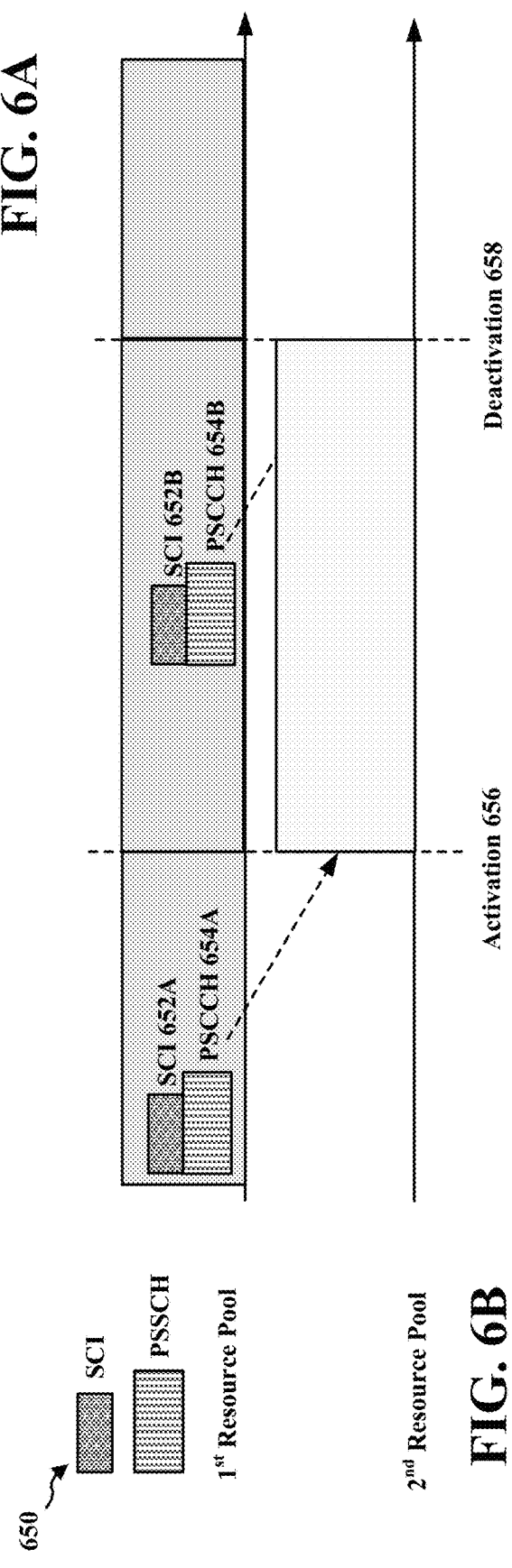

FIGS. 6A and 6B illustrate example bandwidth adaptation mechanisms for power-saving for a UE. The bandwidth adaptation mechanisms may enable the UE to monitor a reduced bandwidth, at times, which may reduce the power used by the UE. As illustrated in example 600 of FIG. 6A, a UE may receive a small amount of data (e.g., data 604) within a BWP/resource pool 602. In some aspects, the small amount of data may be voice communication data (e.g., of a size of 30 Kilobit per second ((Kbps)). After receiving an indication 606 indicating a larger amount of incoming data to be received, the UE may switch to a larger BWP/resource pool 610 to receive a larger amount of incoming data (e.g., ldata 608). In some aspects, the larger amount of incoming data may include high definition video or streaming data (e.g., of a size of 1 Megabits per second (Mbps)). There may be a switching time 606A when the UE switches from the BWP/resource pool 602 to the larger BWP/resource pool 610. After a period of receiving no data (e.g., no data 612), the UE may switch back to the narrower BWP/resource pool 602. Similarly, there may be a switching time 606B when the UE switches from the BWP/resource pool 610 to the BWP/resource pool 602. As illustrated in example 650 of FIG. 6B, a UE may dynamically activate/deactivate a resource pool based on traffic. For example, after receiving an SCI 652A and a PSSCH 654A in a first resource pool, the UE may anticipate more traffic and activate the second resource pool (e.g., at activation 656). The UE may receive a second SCI 652B and a second PSSCH 654B. The UE may deactivate the second resource pool (e.g., at activation 658), such as after the UE no longer expects a large amount of traffic. The use of the larger BWP/resource pool may enable the UE to efficiently receive the larger data, whereas the transition back to the narrower BWP/resource pool may help to reduce power use at the UE. In a UE that utilize such types of bandwidth adaptation, the UE might not be able to perform CBR measurements on the larger/second BWP/resource pool when the UE is not utilizing it.

Figure 7:
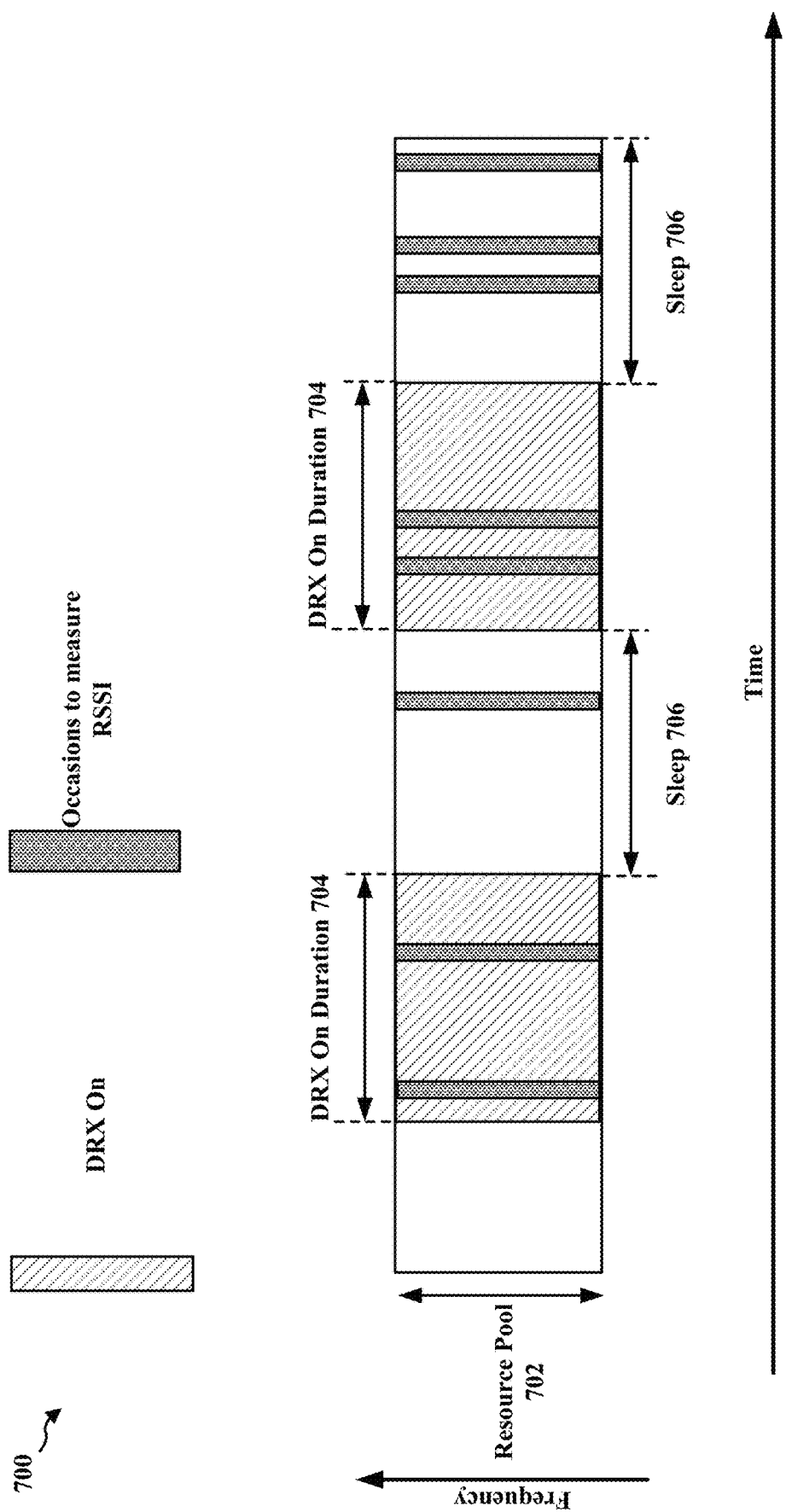
FIG. 7 illustrates an example of a congestion control mechanism.
Figure 8:
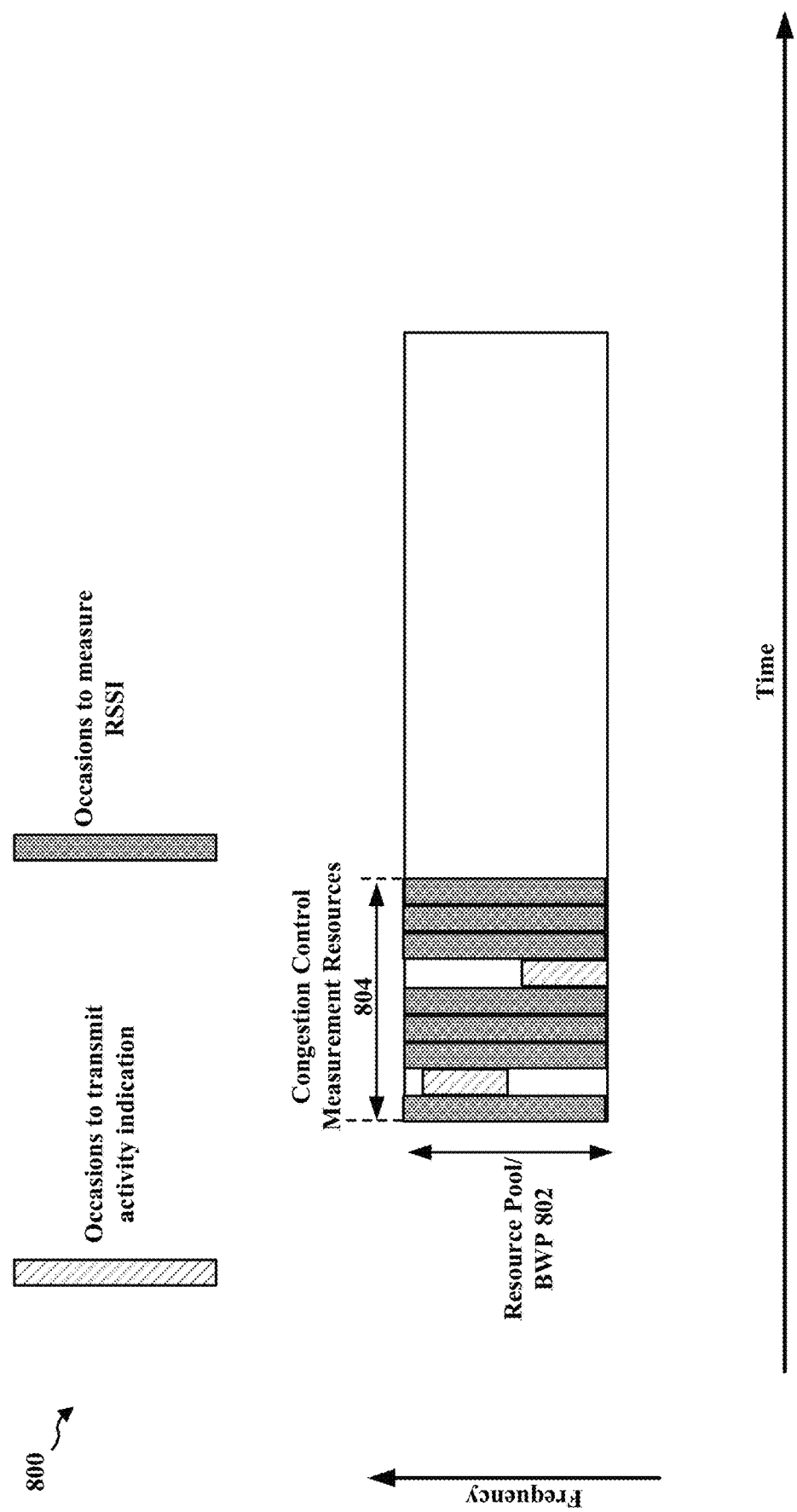
FIG. 8 illustrates an example set of congestion control measurement resources.

Aspects described herein enable those power-saving UEs to perform measurements in the corresponding resource pool/BWP using a set of CBR measurement occasions. FIG. 7 illustrates example 700 of such a congestion control mechanism. The UE may measure RSSI in a resource pool 702 during both DRX on durations 704 and sleep durations 706. As illustrated in example 800 of FIG. 8, a UE may be configured with a set of congestion control measurement resources 804 in the frequency and time domain within a resource pool 802. In some aspects, the set of congestion control measurement resources 804 may include resources that can be used as either transmitting and receiving resources (e.g., occasions) and may be configured/preconfigured to the UE. The UE may transmit signals (such as activity indication signals) on the transmitting resources (e.g., occasions to transmit activity indication) for other UEs to measure its activity. The UE may measure the RSSI of the signals transmitted from other UEs on the receiving resources (e.g., occasions to measure RSSI). In some aspects, the same set of time/frequency domain congestion control measurement resources may be configured/preconfigured to all UEs who may communicate over sidelink in the resource pool 802. In some aspects, the determination of transmitting/receiving resources partition within the set of congestion control measurement resources (e.g., which resources in the set of congestion control measurement resources are transmitting resources and which resources in the set of congestion control measurement resources are receiving resources) may be UE-specific and determined by the respective UEs. Instead of performing RSSI measurements based on PSSCH/PSCCH, the UE may perform RSSI measurements based on the activity indication signals transmitted by other UEs. Similarly, other UEs may perform RSSI measurements based on the activity indication signal transmitted by the UE. In some aspects, the activity indication signals do not include data to be decoded by another UE and the activity may be detected based on the presence of the signal (e.g., a signal with a transmission power higher than a threshold).

Figure 9:
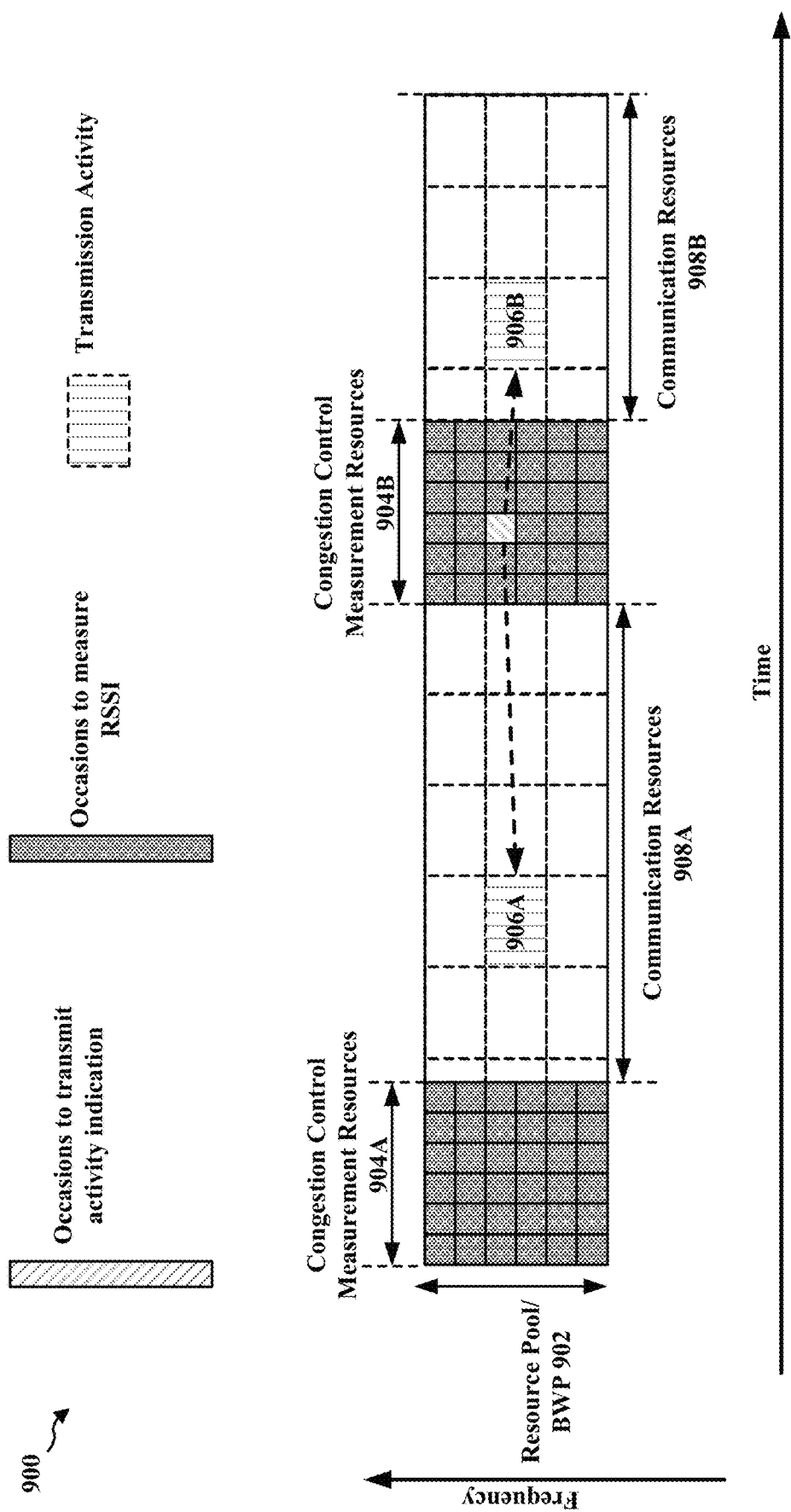
FIG. 9 illustrates an example of mapping between congestion control measurement resources and transmissions.

In some aspects, the determination of transmitting/receiving resources partition within the set of congestion control measurement resources may be based on past or future UE transmission activities. In some aspects, as illustrated in example 900 of FIG. 9, sets of congestion control measurement resources 904A and 904B are periodically configured within a resource pool 902. There may be a mapping (e.g., a 1-to-1 or non 1-to-1 mapping) that maps resources in the communication pool (e.g., resources 906A and 906B in the communication resources 908A and 908B) to a (smaller in size) resource in the measurement sets (e.g., congestion control measurement resources 904A or 904B). If a UE has transmitted or plans to transmit in a resource in the communication pool in a period, the UE may transmit, such as transmit an activity indication, in a corresponding resource (mapped) in the measurement set (e.g., congestion control measurement resources 904A or 904B). The activity indication may be separate from communication channels, such as PSSCH or PSCCH. The activity indication signal may be a dedicated signal that the UE transmits in a particular resource to indicate an intention to transmit a sidelink transmission or to indicate that a sidelink transmission from the UE has been performed in the past, e.g., without explicitly indicating information about the sidelink transmission. For example, in some aspects, if the UE has transmitted in resource 906A in the communication resources 908A, the UE may transmit an activity indication signal in the corresponding resource that is mapped to the resource 906A in the congestion control measurement resources 904B. In some aspects, every resource in the communication resources 908A maps to a resource in the measurement resources 904B, where the measurement resources may always occur later in time than the communication resources 908A. In another example, in some aspects, if the UE plans to transmit in resource 906B in the communication resources 908B, the UE may transmit an activity indication signal in the corresponding resource that is mapped to the resource 906B in the congestion control measurement resources 904B. In some aspects, every resource in the communication resources 908B maps to a resource in the measurement resources 904B, where the measurement resources may always occur earlier in time than the communication resources 908A. For example, a particular activity indication resource may correspond to a subchannel in sidelink communication resources. Based on such mapping, the activities in the measurement set (e.g., the congestion control measurement resources) may provide a compressed summary of the actual activities in the communication pool. In some aspects, the UE may use the same power to transmit the communication and the activity indication. In some aspects, the UE may measure RSSI (e.g., receive and measure RSSI) in the rest of the measurement set (congestion control measurement resources) in which the UE does not transmit an activity indication.

Figure 10:
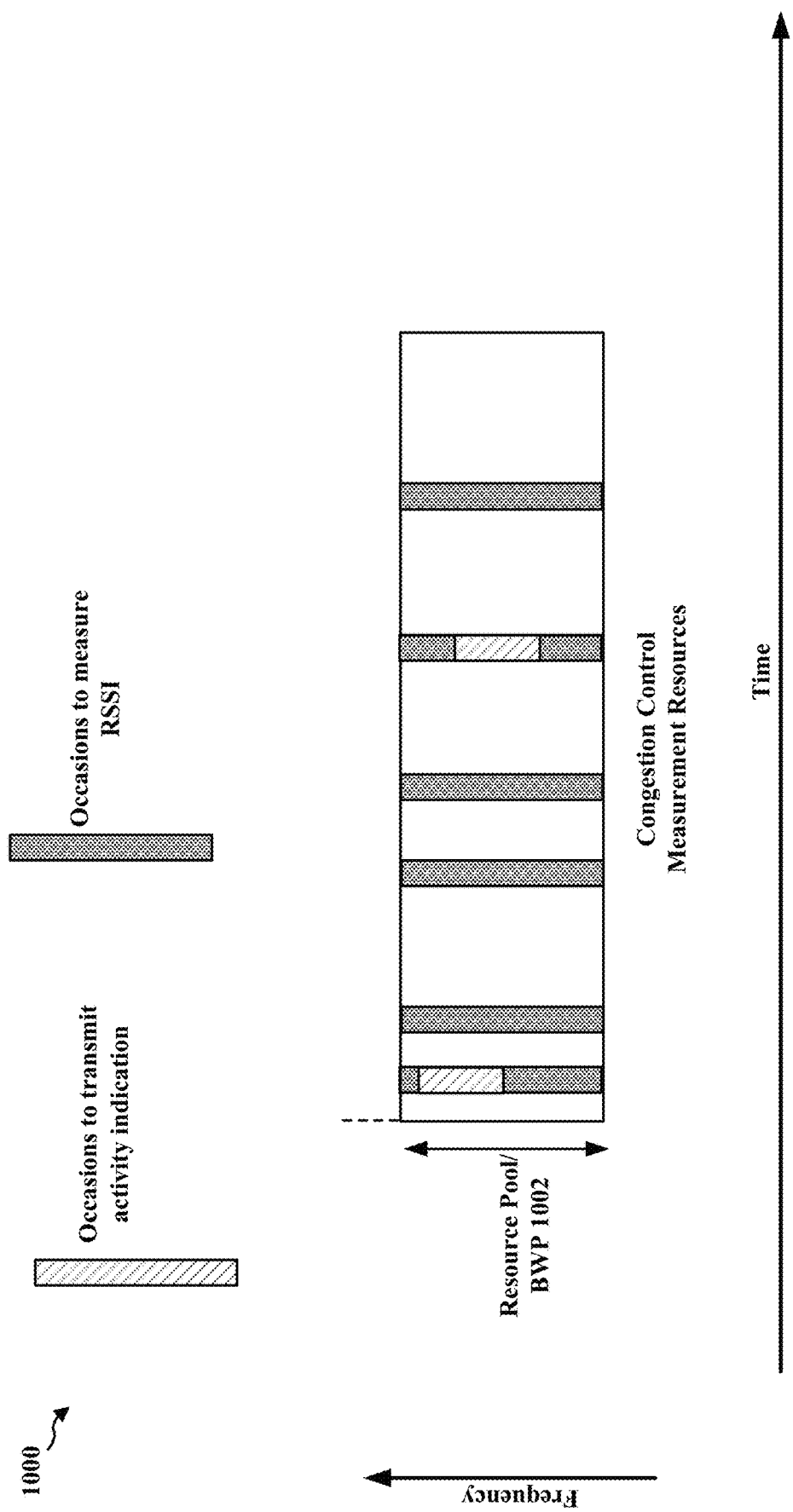
FIG. 10 illustrates an example set of congestion control measurement resources.

In some aspects, the determination of transmitting/receiving resources partition within the set of congestion control measurement resources may be based on a pattern (such as a pseudo-random pattern). In some aspects, a set of congestion control measurement resources may be periodically configured within a resource pool. As illustrated in example 1000 of FIG. 10, resources in the set of congestion control measurement resources within a resource pool 1002 may not be consecutive in time. The UE may transmit (e.g., transmit activity indication) in X % of resources in the set of the congestion control measurement resources and receive (i.e., measure RSSI in the rest of resources in the set of the congestion control measurement resources. The number X may be determined based on the number of communication resources that the UE has used or plans to use, a traffic buffer status, or the like. In some aspects, the selection of the X % resources may be based on the UE identifier (ID), a pseudo-random pattern, a random selection, or the like. Thus, in some examples, there may not be a relationship between the resource for the activity indication and the resources that will be used to transmit the sidelink communication, yet the activity indication signal may still be used for CBR measurements and CR purposes.

Figure 11:
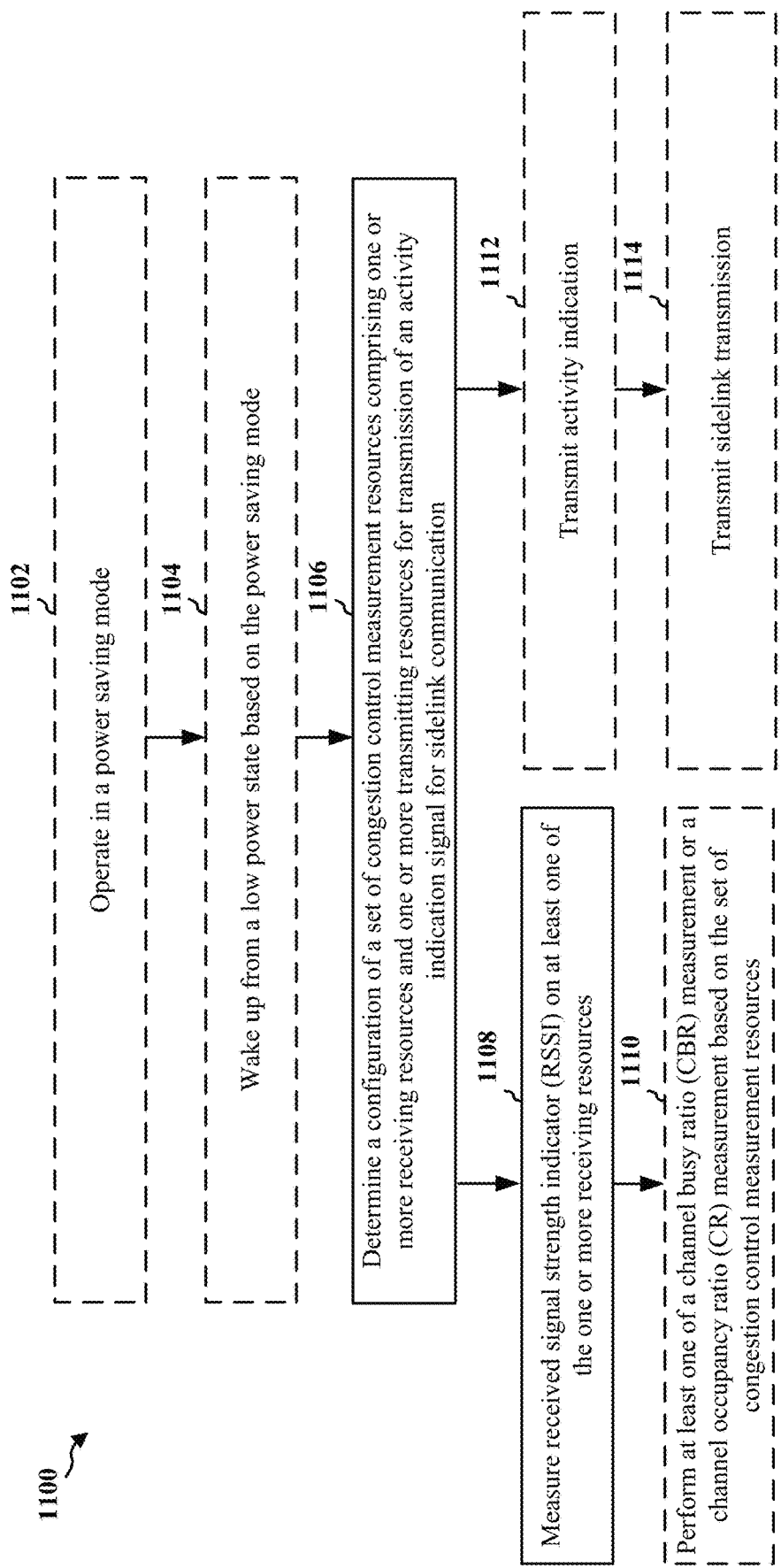
FIG. 11 is a flowchart of a method of wireless communication.

FIG. 11 is a flowchart 1100 of a method of wireless communication. The method may be performed by a UE (e.g., the UE 104, the UE 704A/B/C/D, the UE described in connection with FIGS. 5-10, the apparatus 1202). Optional aspects are illustrated with a dashed line.

At 1102, the UE may operate in a power saving mode. For example, the operating 1102 may be performed by power saving component 1242 in FIG. 12.

At 1104, the UE may wake up from a low power state based on the power saving mode to perform a measurement or a transmission in the set of congestion control measurement resources. For example, the waking up 1104 may be performed by waking up component 1244 in FIG. 12.

At 1106, the UE may determine a configuration of a set of congestion control measurement resources comprising one or more receiving resources and one or more transmitting resources for transmission of an activity indication signal for sidelink communication. For example, the determination 1106 may be performed by resources determination component 1246 in FIG. 12. In some aspects, the configuration comprises periodic occasions. In some aspects, the one or more receiving resources are associated with configured frequency resources and a subset of active frequency resources within the configured resources. In some aspects, the UE measures the RSSI in the configured frequency resources. In some aspects, the configuration of the set of congestion control measurement resources does not comprise an automatic gain control (AGC) symbol or a GAP symbol between the one or more receiving resources and the one or more transmitting resources. For example, in some aspects, the sidelink UEs do not need to decode any messages from the measurement resources, instead, the sidelink UEs may only need to measure the received power (e.g., RSSI) on the measurement resources. In some aspects, the set of congestion control measurement resources is shared with one or more other sidelink devices and the one or more transmitting resources are specific to the UE. In some aspects, the UE further determines the one or more receiving resources and the one or more transmitting resources for the UE. In some aspects, the UE determines the one or more transmitting resources for the activity indication based on resources that map to a past sidelink transmission. In some aspects, the UE determines the one or more transmitting resources for the activity indication based on resources that map to communication resources for a sidelink transmission. In some aspects, determining the one or more receiving resources comprises determining resources in the set of congestion control measurement resources that are not the one or more transmitting resources as the one or more receiving resources. In some aspects, the UE determines the one or more transmitting resources as a percentage of the congestion control measurement resources based on an amount of communication resources for a sidelink transmission from the UE. In some aspects, the UE determines the one or more transmitting resources as a percentage of the congestion control measurement resources based on a traffic buffer status. In some aspects, the set of congestion control measurement resources is non-consecutive in time. In some aspects, the set of congestion control measurement resources is consecutive in time.

At 1108, the UE may measure RSSI on at least one of the one or more receiving resources. For example, the measurement 1108 may be performed by RSSI measurement component 1248 in FIG. 12. In some aspects, the UE measures the RSSI on the at least one of the one or more receiving resources without decoding a signal received in the at least one of the one or more receiving resources. In some aspects, the UE may only transmit the indication signal within the active BWP/resource pool/CC and the UE may measure RSSI within all configured BWPs/resource pools/CCs.

At 1110, the UE may perform at least one of a CBR measurement or a CR measurement based on the set of congestion control measurement resources. For example, the measurement 1110 may be performed by CBR measurement component 1250 in FIG. 12.

At 1112, the UE may transmit an activity indication using the one or more transmitting resources in an occasion of the set of congestion control measurement resources. For example, the transmission 1112 may be performed by activity indication component 1252 in FIG. 12. In some aspects, the activity indication is for RSSI measurements for computing a CBR by one or more other sidelink devices. In some aspects, the UE may transmit the activity indication within the subset of active frequency resources. For example, the UE may transmit the activity indication within the active BWP, the active resource pool, or the active component carrier. In some aspects, transmitting the activity indication comprises transmitting a known sequence. In some aspects, the UE may transmit the activity indication in a resource within the congestion control measurement resources based on a UE ID of the UE. In some aspects, the UE transmits the activity indication in a resource within the congestion control measurement resources based on a pseudo-random pattern. In some aspects, the UE transmits the activity indication in a resource within the congestion control measurement resources based on a random selection. In some aspects, the UE may transmit the activity indication using a sequence (e.g., a configured sequence), the UE may not convey any additional information in transmitting the activity indication.

At 1114, the UE may transmit sidelink control information indicating resources for the sidelink transmission and transmit the sidelink transmission in one or more communication resources. For example, the transmission 1114 may be performed by sidelink transmission component 1254 in FIG. 12. In some aspects, the UE transmits the sidelink transmission in the communication resources using a same transmission power as for the activity indication. In some aspects, the sidelink transmission occurs prior to the activity indication. In some aspects, the sidelink transmission occurs after the activity indication.

Figure 12:
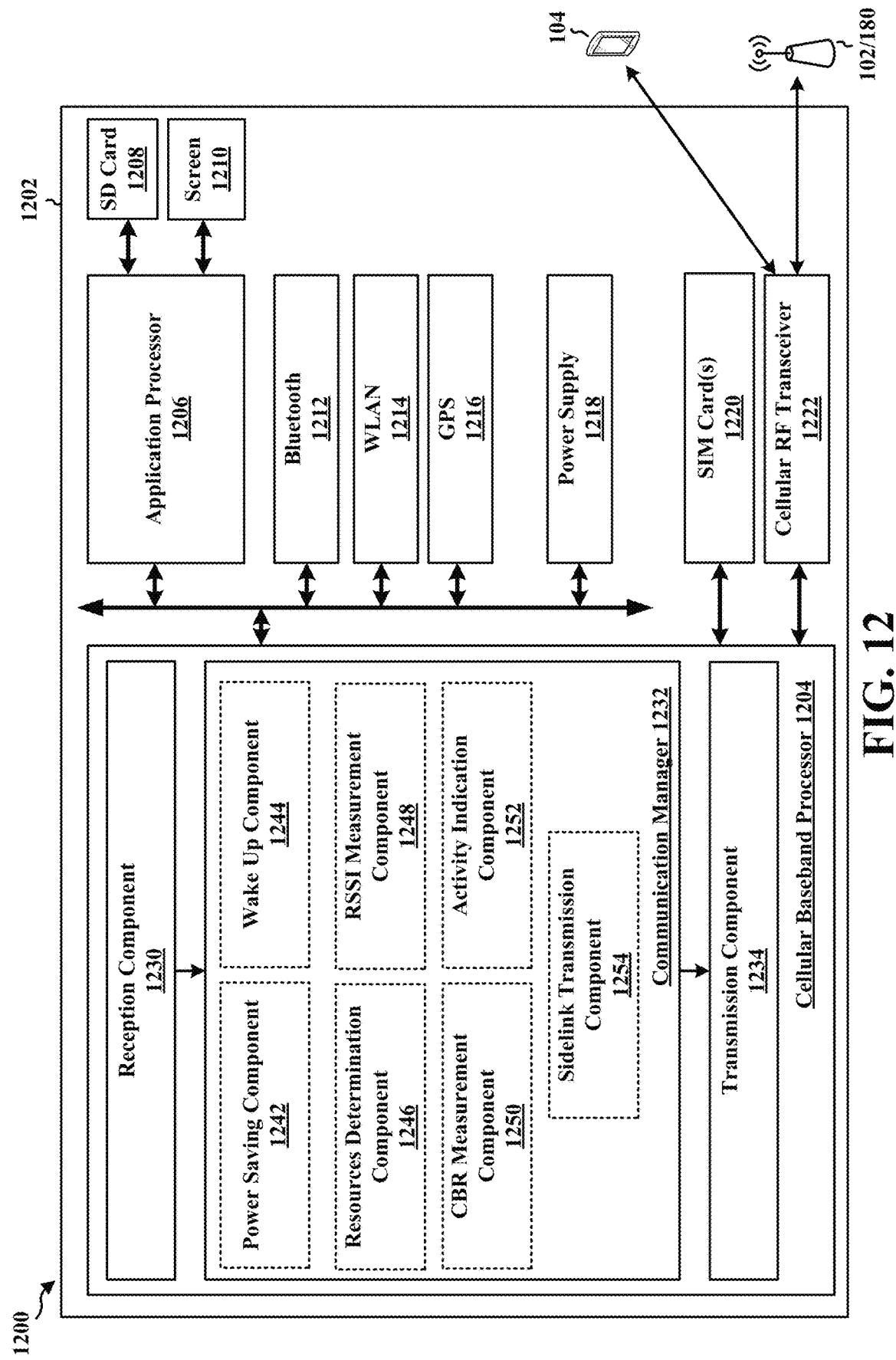
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a power saving component 1242 that operates in a power saving mode, e.g., as described in connection with 1102 of FIG. 11. The communication manager 1232 may further include a wake up component 1244 that wakes up from a low power state based on the power saving mode to perform a measurement or a transmission in the set of congestion control measurement resources, e.g., as described in connection with 1104 of FIG. 11. The communication manager 1232 may further include a resources determination component 1246 that determines a configuration of a set of congestion control measurement resources comprising one or more receiving resources and one or more transmitting resources for transmission of an activity indication signal for sidelink communication, e.g., as described in connection with 1106 of FIG. 11. The communication manager 1232 may further include a RSSI measurement component 1248 that measures RSSI on at least one of the one or more receiving resources, e.g., as described in connection with 1108 of FIG. 11. The communication manager 1232 may further include a CBR measurement component 1250 that performs at least one of a CBR measurement or a CR measurement based on the set of congestion control measurement resources, e.g., as described in connection with 1110 of FIG. 11. The communication manager 1232 may further include an activity indication component 1252 that transmits an activity indication using the one or more transmitting resources in an occasion of the set of congestion control measurement resources, e.g., as described in connection with 1112 of FIG. 11. The communication manager 1232 may further include a sidelink transmission component 1254 that transmits sidelink control information indicating resources for the sidelink transmission and transmits the sidelink transmission in one or more communication resources, e.g., as described in connection with 1114 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband cellular processor 1204, includes means for determining a configuration of a set of congestion control measurement resources comprising one or more receiving resources and one or more transmitting resources for transmission of an activity indication signal for sidelink communication. The baseband cellular processor 1204 may further include means for measuring RSSI on at least one of the one or more receiving resources. The baseband cellular processor 1204 may further include means for operating in a power saving mode. The baseband cellular processor 1204 may further include means for performing at least one of a CBR measurement or a CR measurement based on the set of congestion control measurement resources. The baseband cellular processor 1204 may further include means for waking up from a low power state based on the power saving mode to perform a measurement or a transmission in the set of congestion control measurement resources. The baseband cellular processor 1204 may further include means for transmitting an activity indication using the one or more transmitting resources in an occasion of the set of congestion control measurement resources. The baseband cellular processor 1204 may further include means for transmitting sidelink control information indicating resources for the sidelink transmission. The baseband cellular processor 1204 may further include means for transmitting the sidelink transmission in one or more communication resources. The baseband cellular processor 1204 may further include means for transmitting an activity indication within the subset of active frequency resources. The baseband cellular processor 1204 may further include means for transmitting a known sequence. The baseband cellular processor 1204 may further include means for determining the one or more receiving resources and the one or more transmitting resources for the UE. The baseband cellular processor 1204 may further include means for transmitting the sidelink transmission in the communication resources using a same transmission power as for the activity indication. The baseband cellular processor 1204 may further include means for transmitting the activity indication in a resource within the congestion control measurement resources based on a UE ID of the UE. The baseband cellular processor 1204 may further include means for transmitting the activity indication in a resource within the congestion control measurement resources based on a pseudo-random pattern. The baseband cellular processor 1204 may further include means for transmitting the activity indication in a resource within the congestion control measurement resources based on a random selection.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: determining a configuration of a set of congestion control measurement resources comprising one or more receiving resources and one or more transmitting resources for transmission of an activity indication signal for sidelink communication; and measuring RSSI on at least one of the one or more receiving resources.

Aspect 2 is the method of aspect 1, further comprising: operating in a power saving mode; and performing at least one of a CBR measurement or a CR measurement based on the set of congestion control measurement resources.

Aspect 3 is the method of any of aspects 1-2, further comprising: waking up from a low power state based on the power saving mode to perform a measurement or a transmission in the set of congestion control measurement resources.

Aspect 4 is the method of any of aspects 1-3, further comprising: transmitting an activity indication using the one or more transmitting resources in an occasion of the set of congestion control measurement resources.

Aspect 5 is the method of any of aspects 1-4, further comprising: transmitting sidelink control information indicating resources for the sidelink transmission; and transmitting the sidelink transmission in one or more communication resources.

Aspect 6 is the method of any of aspects 1-5, wherein the configuration comprises periodic occasions.

Aspect 7 is the method of any of aspects 1-6, wherein the activity indication is for RSSI measurements for computing a CBR by one or more other sidelink devices.

Aspect 8 is the method of any of aspects 1-7, wherein the one or more receiving resources are associated with configured frequency resources and a subset of active frequency resources within the configured resources, wherein the UE measures the RSSI in the configured frequency resources.

Aspect 9 is the method of any of aspects 1-8, further comprising: transmitting an activity indication within the subset of active frequency resources.

Aspect 10 is the method of any of aspects 1-9, wherein the configured frequency resources comprises one or more of: one or more resource pools, one or more sidelink BWPs, or one or more sidelink component carriers.

Aspect 11 is the method of any of aspects 1-10, wherein transmitting the activity indication comprises transmitting a known sequence.

Aspect 12 is the method of any of aspects 1-11, wherein the configuration of the set of congestion control measurement resources does not comprise an AGC symbol or a GAP symbol between the one or more receiving resources and the one or more transmitting resources.

Aspect 13 is the method of any of aspects 1-12, wherein the set of congestion control measurement resources is shared with one or more other sidelink devices and the one or more transmitting resources are specific to the UE.

Aspect 14 is the method of any of aspects 1-13, further comprising: determining the one or more receiving resources and the one or more transmitting resources for the UE.

Aspect 15 is the method of any of aspects 1-14, wherein the UE determines the one or more transmitting resources for the activity indication based on resources that map to a past sidelink transmission.

Aspect 16 is the method of any of aspects 1-15, wherein the UE determines the one or more transmitting resources for the activity indication based on resources that map to communication resources for a sidelink transmission.

Aspect 17 is the method of any of aspects 1-16, further comprising: transmitting the sidelink transmission in the communication resources using a same transmission power as for the activity indication.

Aspect 18 is the method of any of aspects 1-17, wherein determining the one or more receiving resources comprises determining resources in the set of congestion control measurement resources that are not the one or more transmitting resources as the one or more receiving resources.

Aspect 19 is the method of any of aspects 1-18, wherein the UE determines the one or more transmitting resources as a percentage of the congestion control measurement resources based on an amount of communication resources for a sidelink transmission from the UE.

Aspect 20 is the method of any of aspects 1-19, wherein the sidelink transmission occurs prior to the activity indication.

Aspect 21 is the method of any of aspects 1-20, wherein the sidelink transmission occurs after the activity indication.

Aspect 22 is the method of any of aspects 1-21, wherein the UE determines the one or more transmitting resources as a percentage of the congestion control measurement resources based on a traffic buffer status.

Aspect 23 is the method of any of aspects 1-22, further comprising: transmitting the activity indication in a resource within the congestion control measurement resources based on a UE ID of the UE.

Aspect 24 is the method of any of aspects 1-23, further comprising: transmitting the activity indication in a resource within the congestion control measurement resources based on a pseudo-random pattern.

Aspect 25 is the method of any of aspects 1-24, further comprising: transmitting the activity indication in a resource within the congestion control measurement resources based on a random selection.

Aspect 26 is the method of any of aspects 1-25, wherein the set of congestion control measurement resources is non-consecutive in time.

Aspect 27 is the method of any of aspects 1-26, wherein the set of congestion control measurement resources is consecutive in time.

Aspect 28 is the method of any of aspects 1-27, wherein the UE measures the RSSI on the at least one of the one or more receiving resources without decoding a signal received in the at least one of the one or more receiving resources.

Aspect 29 is an apparatus for wireless communication including at least one processor coupled to a memory and configured to implement a method as in any of aspects 1 to 28.

Aspect 30 is an apparatus for wireless communication including means for implementing a method as in any of aspects 1 to 28.

Aspect 31 is a computer-readable medium storing computer executable code, where the code when executed by a processor causes the processor to implement a method as in any of aspects 1 to 28.

What is claimed is:

1. A method of wireless communication at a user equipment (UE), comprising:
    determining a configuration of a set of congestion control measurement resources comprising one or more receiving resources and one or more transmitting resources for transmission of an activity indication signal for sidelink communication, wherein every transmitting resource in the set of congestion control measurement resources maps to a corresponding transmitting resource in one or more communication resources of the UE;
    measuring received signal strength indicator (RSSI) on at least one of the one or more receiving resources; and
    transmitting an activity indication and a sidelink transmission, wherein the activity indication is transmitted using a first transmitting resource in the one or more transmitting resources, and the sidelink transmission is transmitted in a first communication resource in the one or more communication resources, wherein the first transmitting resource maps to the first communication resource.

2. The method of claim 1, further comprising:
    operating in a power saving mode; and
    performing at least one of a channel busy ratio (CBR) measurement or a channel occupancy ratio (CR) measurement based on the set of congestion control measurement resources.

3. The method of claim 2, further comprising:
    waking up from a low power state based on the power saving mode to perform a measurement or transmit in the set of congestion control measurement resources.

4. The method of claim 1, wherein transmitting the activity indication comprises:
    transmitting the activity indication to one or more sidelink devices via the sidelink communication.

5. The method of claim 4, further comprising:
    transmitting sidelink control information indicating resources for the sidelink transmission.

6. The method of claim 1, wherein the configuration comprises periodic occasions.

7. The method of claim 6, wherein the activity indication signal is for RSSI measurements for computing a channel busy ratio (CBR) by one or more sidelink devices.

8. The method of claim 1, wherein the one or more receiving resources are associated with configured frequency resources and a subset of active frequency resources within the configured frequency resources, wherein the UE measures the RSSI in the configured frequency resources.

9. The method of claim 8, wherein transmitting the activity indication comprises:
    transmitting the activity indication within the subset of active frequency resources.

10. The method of claim 8, wherein the configured frequency resources comprise one or more of: one or more resource pools, one or more sidelink bandwidth parts (BWPs), or one or more sidelink component carriers.

11. The method of claim 1, wherein transmitting the activity indication signal comprises transmitting a known sequence.

12. The method of claim 1, wherein the configuration of the set of congestion control measurement resources does not comprise an automatic gain control (AGC) symbol or a GAP symbol between the one or more receiving resources and the one or more transmitting resources.

13. The method of claim 1, wherein the set of congestion control measurement resources is shared with one or more sidelink devices and the one or more transmitting resources are specific to the UE.

14. The method of claim 13, further comprising:
    determining the one or more receiving resources and the one or more transmitting resources for the UE.

15. The method of claim 14, wherein the UE determines the one or more transmitting resources for the activity indication signal based on resources that map to a past sidelink transmission.

16. The method of claim 14, wherein the UE determines the one or more transmitting resources for the activity indication signal based on resources that map to the one or more communication resources for the sidelink transmission.

17. The method of claim 14, wherein transmitting the sidelink transmission comprises:
    transmitting the sidelink transmission in the one or more communication resources using a same transmission power as for the activity indication signal.

18. The method of claim 13, wherein determining the one or more receiving resources comprises determining resources in the set of congestion control measurement resources that are not the one or more transmitting resources as the one or more receiving resources.

19. The method of claim 13, wherein the UE determines the one or more transmitting resources as a percentage of the set of congestion control measurement resources based on an amount of the one or more communication resources for the sidelink transmission from the UE.

20. The method of claim 19, wherein the sidelink transmission occurs prior to the activity indication signal.

21. The method of claim 19, wherein the sidelink transmission occurs after the activity indication signal.

22. The method of claim 19, wherein the UE determines the one or more transmitting resources as the percentage of the set of congestion control measurement resources based on a traffic buffer status.

23. The method of claim 19, further comprising:
    transmitting the activity indication signal in a resource within the set of congestion control measurement resources based on a UE identifier (ID) of the UE.

24. The method of claim 19, further comprising:
    transmitting the activity indication signal in a resource within the set of congestion control measurement resources based on a pseudo-random pattern.

25. The method of claim 19, further comprising:
    transmitting the activity indication signal in a resource within the set of congestion control measurement resources based on a random selection.

26. The method of claim 1, wherein the set of congestion control measurement resources is non-consecutive in time.

27. The method of claim 1, wherein the set of congestion control measurement resources is consecutive in time.

28. The method of claim 1, wherein the UE measures the RSSI on the at least one of the one or more receiving resources without decoding a signal received in the at least one of the one or more receiving resources.

29. An apparatus for wireless communication at a user equipment (UE), comprising:
a memory; and
at least one processor coupled to the memory and configured to:
determine a configuration of a set of congestion control measurement resources comprising one or more receiving resources and one or more transmitting resources for transmission of an activity indication signal for sidelink communication, wherein every transmitting resource in the set of congestion control measurement resources maps to a corresponding transmitting resource in one or more communication resources of the UE;
measure received signal strength indicator (RSSI) on at least one of the one or more receiving resources; and
transmit an activity indication and a sidelink transmission, wherein the activity indication is transmitted using a first transmitting resource in the one or more transmitting resources, and the sidelink transmission is transmitted in a first communication resource in the one or more communication resources, wherein the first transmitting resource maps to the first communication resource.

30. An apparatus for wireless communication at a user equipment (UE), comprising:
means for determining a configuration of a set of congestion control measurement resources comprising one or more receiving resources and one or more transmitting resources for transmission of an activity indication signal for sidelink communication, wherein every transmitting resource in the set of congestion control measurement resources maps to a corresponding transmitting resource in one or more communication resources of the UE;
means for measuring received signal strength indicator (RSSI) on at least one of the one or more receiving resources; and
means for transmitting an activity indication and a sidelink transmission, wherein the activity indication is transmitted using a first transmitting resource in the one or more transmitting resources, and the sidelink transmission is transmitted in a first communication resource in the one or more communication resources, wherein the first transmitting resource maps to the first communication resource.

* * * * *